United States Patent
Meiyappan et al.

(10) Patent No.: US 8,997,125 B2
(45) Date of Patent: Mar. 31, 2015

(54) SYSTEM AND METHOD TO PRINT DOCUMENTS AND IMAGES THAT ARE NOT NATIVELY SUPPORTED BY THE PRINTER

(75) Inventors: Somasundaram Meiyappan, Singapore (SG); Carl Mikkelsen, Wayland, MA (US)

(73) Assignee: Conexant Systems, Inc., Newport Beach, CA (US)

( * ) Notice: Subject to any disclaimer, the term of this patent is extended or adjusted under 35 U.S.C. 154(b) by 113 days.

(21) Appl. No.: 13/560,439

(22) Filed: Jul. 27, 2012

(65) Prior Publication Data

US 2012/0307305 A1  Dec. 6, 2012

Related U.S. Application Data

(63) Continuation-in-part of application No. 13/149,713, filed on May 31, 2011.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 3/12* | (2006.01) |

(52) U.S. Cl.
CPC ............ *G06F 3/1206* (2013.01); *G06F 3/1247* (2013.01); *G06F 3/128* (2013.01); *G06F 3/1285* (2013.01)
USPC .......................................................... 719/328

(58) Field of Classification Search
None
See application file for complete search history.

(56) References Cited

U.S. PATENT DOCUMENTS

| | | | |
|---|---|---|---|
| 7,565,414 B1 * | 7/2009 | Love | 709/219 |
| 7,814,111 B2 * | 10/2010 | Levin | 707/756 |
| 8,065,436 B2 * | 11/2011 | Asthana et al. | 709/245 |
| 8,189,225 B1 | 5/2012 | Lo et al. | |
| 2008/0016112 A1 * | 1/2008 | Reddy et al. | 707/104.1 |
| 2009/0089811 A1 * | 4/2009 | Ferlitsch | 719/321 |
| 2010/0073707 A1 | 3/2010 | Ferlitsch | |
| 2011/0007347 A1 | 1/2011 | Kamath et al. | |
| 2011/0188063 A1 | 8/2011 | Nuggehalli et al. | |
| 2011/0235085 A1 | 9/2011 | Jazayeri et al. | |
| 2011/0255128 A1 | 10/2011 | Ozawa | |
| 2011/0299110 A1 | 12/2011 | Jazayeri et al. | |
| 2012/0057193 A1 | 3/2012 | Jazayeri et al. | |
| 2012/0099146 A1 | 4/2012 | Stokes et al. | |
| 2012/0140285 A1 | 6/2012 | Kamath et al. | |
| 2013/0033722 A1 * | 2/2013 | Kamath et al. | 358/1.15 |

* cited by examiner

*Primary Examiner* — H S Sough
*Assistant Examiner* — William C Wood
(74) *Attorney, Agent, or Firm* — Haynes and Boone, LLP

(57) ABSTRACT

A system for printing comprising a plurality of local printer applications operating on a processor, each configured to render a single associated file type for printing. A print through server application operating on the processor and configured to transmit a print job to an external processor for rendering. A system manager operating on the processor and configured to transmit a file to one of the plurality of local printer applications if the file has a file type that is identical to the file type associated with one of the local printer applications, and to transmit the file to the print through server application if the file type of the file does not match any of the file types for the local printer applications.

20 Claims, 7 Drawing Sheets

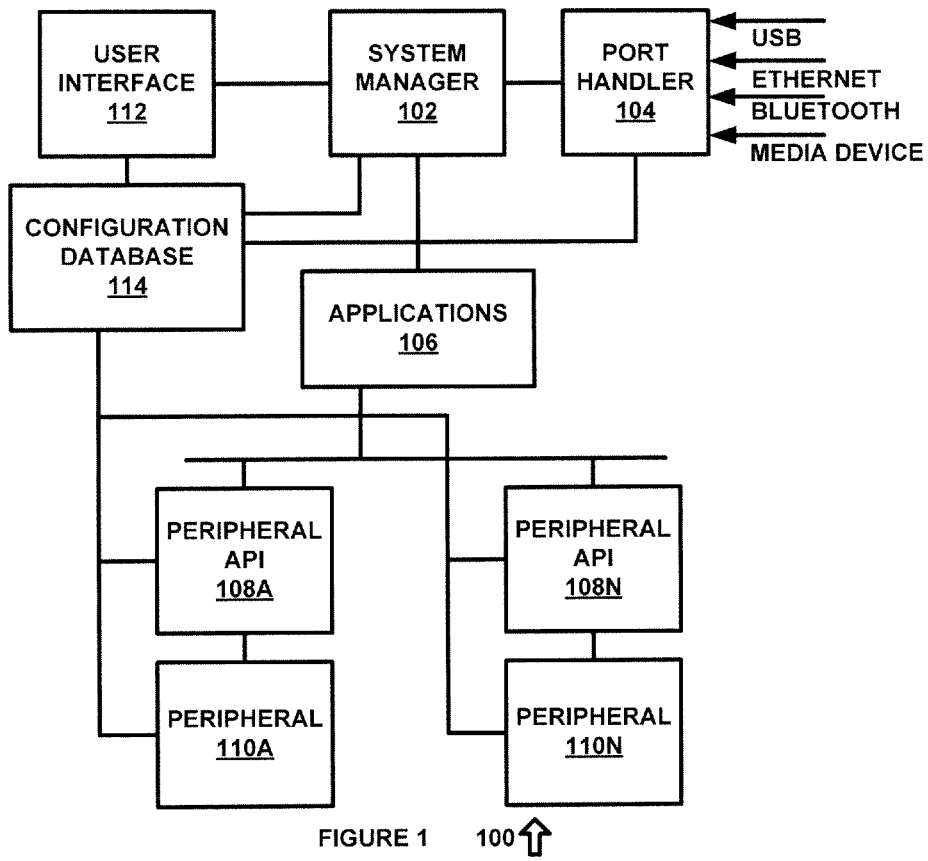
FIGURE 1    100
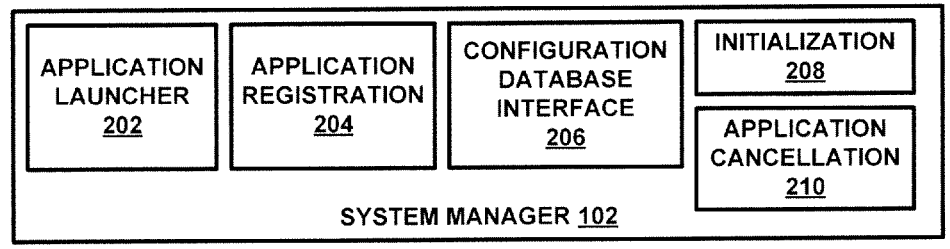
FIGURE 2    200

SYSTEM AND METHOD TO PRINT DOCUMENTS AND IMAGES THAT ARE NOT NATIVELY SUPPORTED BY THE PRINTER

RELATED APPLICATIONS

This application is a continuation-in-part application of U.S. patent application Ser. No. 13/149,713, entitled "REGULAR EXPRESSION SELECTION FOR CONFIGURABLE APPLICATION DATA STEERING," filed May 31, 2011, and is related to the following commonly owned and co-pending applications, which are hereby incorporated by reference for all purposes: U.S. patent application Ser. No. 13/149,747, entitled "PERSISTENT DATA STORAGE," filed May 31, 2011; U.S. patent application Ser. No. 13/149,725, entitled "DATABASE HIERARCHICAL INHERITANCE," filed May 31, 2011, and U.S. patent application Ser. No. 13/149,735, entitled "ASYNCHRONOUS PROCESS NOTIFICATION," filed May 31, 2011.

TECHNICAL FIELD

The application relates generally printer controls, and more specifically to a system and method to print documents and images that are not natively supported by the printer.

BACKGROUND OF THE INVENTION

A typical printer/MFP supports only a few image or document formats. Many commonly used image/document formats are not natively supported by the printer. When printing from a portable memory storage device or printing from other networking devices, it is often the case that the printer is not compatible with the image/document formats presented on or by such devices.

SUMMARY OF THE INVENTION

A system for printing is provided. The system includes a plurality of local printer applications, each configured to render one or more associated file types for printing. A print through server application is configured to transmit a print job to an external processor for rendering. A system manager operating on the processor transmits a file to one of the plurality of local printer applications if the file has a file type that is identical to the file type associated with one of the local printer applications, and transmits the file to the print through server application if the file type of the file does not match any of the file types for the local printer applications.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is a diagram of a system in accordance with an exemplary embodiment of the present invention;

FIG. 2 is a diagram of system for providing system manager functionality in accordance with an exemplary embodiment of the present disclosure;

DETAILED DESCRIPTION OF THE INVENTION

Figure 3:
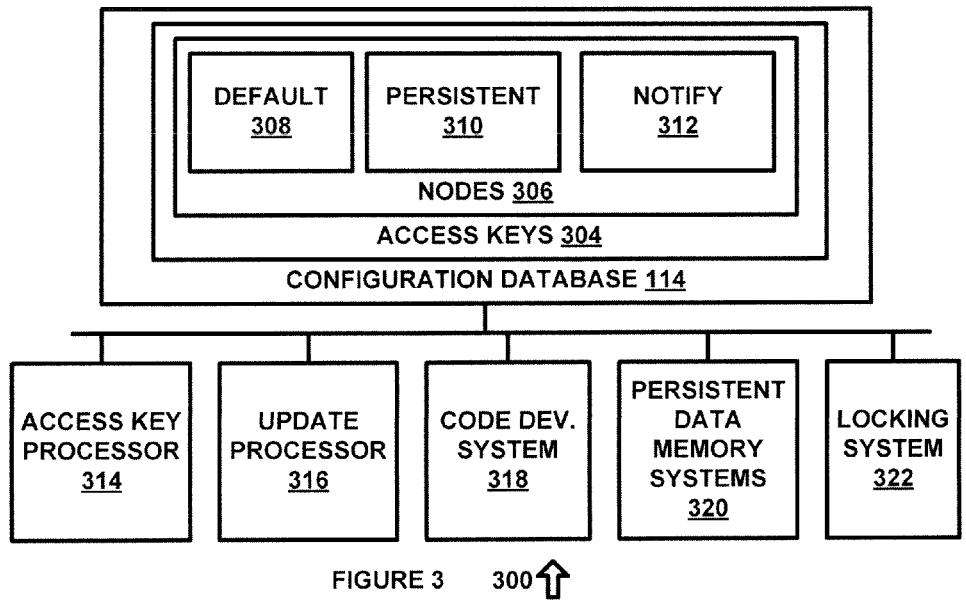
FIG. 3 is a diagram of a system for providing configuration database functionality in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

FIG. 1 is a diagram of a system 100 for configuring and accessing a configuration database in accordance with an exemplary embodiment of the present invention. System 100 can be implemented in hardware or a suitable combination of hardware and software, and can be one or more software systems operating on a multi-function peripheral processor, a digital signal processor or other suitable general or special purpose processing systems.

As used herein, and by way of example and not by limitation, "hardware" can include a combination of discrete components, an integrated circuit, an application-specific integrated circuit, a field programmable gate array, a general purpose processing or server platform, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 100 includes system manager 102, host communications 104, applications 106, peripheral application programming interface (API) 108A through 108N, peripheral 110A through 110N and configuration database 114. The control of resources is managed by the components that need the resources. For example, user interface 112, system manager 102 and applications 106 do not need to know the address of memory buffers or other resources that are needed by a peripheral 110A through 110N, such as a scanner or a printer.

System manager 102 determines whether an application can be started. For example, user interface 112 does not need to determine if the printer is currently printing. If a user enters commands into user interface 112 to start a copy operation, user interface 112 does not require data regarding resources that are currently busy. User interface 112 transmits command data to request system manager 102 to start the copy application. In one exemplary embodiment, this architecture can be used to eliminate system error, such as from race conditions between an application and a user requesting functions from user interface 112.

System 100 further includes peripheral API 108A through 108N, which can be a common API for applications 106 that are accessed by system manager 102. In one exemplary embodiment, user interface 112 can communicate parameters to applications 106 through configuration database 114 instead of the peripheral API 108A through 108N for applications 106. In this manner, the only data that system manager 102 needs to launch an application is the entry point.

Applications 106 register with system manager 102 by providing a name (as a string), and data that defines how to pass control to each application. For example, this data can include an entry point address, a command line that is used to launch the application, or other suitable data. In this manner, system manager 102 does not need to be pre-loaded with data that defines applications 106 that are built into a product that uses system 100. System manager 102 can manipulate applications, but does not need to maintain data that identifies which applications could exist, but only data about which applications do exist.

When user interface 112 or any other suitable system needs to invoke an application, a request is transmitted to system manager 102, which can start an application by name, by matching against the members of a class, or in other suitable manners. To match against a class, the requesting system transmits a string to system manager 102, such as the first bytes from a file to be processed, and a class name. System manager 102 matches the string against the regular expressions registered with each application, looking for a match. If a match is found, the application name is used as if the name had been provided to system manager 102 as the application name.

FIG. 2 is a diagram of system 200 for providing system manager 102 functionality in accordance with an exemplary embodiment of the present disclosure. System 200 includes system manager 102 which is further composed of application launcher 202, application registration 204, configuration database interface 206, initialization 208 and application cancellation 210, each of which can be implemented in hardware or a suitable combination of hardware and software.

Application launcher 202 can be provided for use with a user interface function and other parts of system 100 that need to start an application or monitor the status of an application. Such user interface functions can also allow the status of the application to be determined. For example, a gross status indicator can be used to provide information about the current execution state of the application, such as whether execution is pending, has been started, has started and failed, has completed, or other suitable state information. Communication of the status between the user interface (or other system) and the application is accomplished using configuration database 114.

Applications can be launched into a suitable execution slot by immediately being launched through a start API, by being launched later after a user-defined delay through a delay API (such as to launch applications at a scheduled time), or in other suitable manners. In one exemplary embodiment, system manager 102 can create an activity node and return a node reference through an "activity" parameter. A persistent node can also be used to store application launch information so that a loss of power before the application is launched does not prevent the application from starting.

Application registration 204 registers applications with configuration database 114 and other suitable systems. In one exemplary embodiment, an application can be named using a hierarchical naming scheme, such as an XML-based scheme, so as to allow the application name to also be a node identifier in configuration database 114. An application can also be registered as a member of a class.

Configuration database interface 206 provides an application programming interface or other suitable interface to configuration database 114. In one exemplary embodiment, configuration database 114 can be used by system manager 102 and other systems to communicate status information or other suitable information for applications or other components of system 100. System manager 102 thus interfaces with configuration database 114 through configuration database interface 206 to start or terminate applications, to facilitate communications between applications or components, or for other suitable purposes.

Initialization 208 performs initialization operations for system manager 102 and configuration database 114, such as to initialize a number of processor slots, to allocate memory, and to perform other suitable operations. In one exemplary embodiment, an estimated size is obtained to determine an amount of memory to be reserved for the database storage, such as by using an average number of size times a number of database entries or in other suitable manners. Initialization 208 can populate configuration database 114 with initial contents, such as by using a bulk population procedure. Bulk population of the database can be done 1) using an XML stream that adheres to the hierarchical naming schema, 2) by pointing to an object that contains such an XML stream, 3) from streams that follow the proprietary format in which persistent objects are stored, or in other suitable manners. A complementary function can be used to convert a database context into a bulk structure. In another exemplary embodiment, API calls can be used to set the initial contents of nodes associated with the keys of configuration database 114.

Application cancellation 210 performs cancellation processing for an application that has been scheduled, an application that is in operation, or other suitable activities. Typically, a cancellation routine is required to cancel an application or activity. An activity can be cancelled where the application itself will not be cancelled, such as a print job for a printer. Two APIs can be provided to assist with canceling such activities. The first API can be a helper function that provides a list of activities that can be canceled, such as with an option to retrieve only the activity of the highest hierarchy if the intention is to cancel the application. The second API can be used to trigger a cancellation of an activity. For example, if an activity has not started (such as a delayed start application), then the node can be deleted and a callback can be made to let the associated client know that the application was cancelled and never started. For an application that has never started, the cleanup function can still be called at the end of the cancellation procedure.

Application cancellation can provide the callback indirectly, where a piece of code that requires confirmation of a completed cancel is registered for a notification function through configuration database 114 for the node. The reapplication cancellation can also be provided through a configuration database 114 node or in other suitable manners, such as for debugging or other suitable purposes. The calling thread information and current time can also be recorded before submitting the activity to application cancellation 210 for canceling the activity. The activity is deemed canceled when the activity sets its completion status in configuration database 114. Application cancellation 210 can then delete the activity from an activities tree.

In operation, system 200 provides system manager 102 functionality that is used to manage operations of the components of system 100 in accordance with the present disclosure. System 200 uses configuration database 114 to communication between components of system 100.

FIG. 3 is a diagram of a system 300 for providing configuration database functionality in accordance with an exemplary embodiment of the present disclosure. System 300 includes configuration database 114 and access keys 304, nodes 306, default nodes 308, persistent nodes 310, notify nodes 312, access key processor 314, update processor 316, code development system 318, persistent data memory systems 320 and locking system 322, each of which can be implemented in hardware or a suitable combination of hardware and software.

Access keys 304 are used to access data stored in configuration database 114. An access key can be named using a hierarchical naming schema, such as an XML-compliant naming schema. In one exemplary embodiment, an XML-based naming schema might result in an access key having a value of "/A/B/C/D," where a text string is associated with each of the variables A through D.

Nodes 306 refer to the data strings stored within configuration database 114. A node can be characterized as a key value that contains sub-keys, and the terms "node," "key," "sub-node" and "sub-key" can refer to the same data structure, but connote different relative meanings. For example, a key is used to locate a node, and the node associated with the key will typically include additional data beyond that data that defines the key. Likewise, a node may have associated sub-nodes, where the key that is used to locate a node can also be used to locate the associated sub-nodes. Data can be stored in a node in a suitable predetermined data format. A node can also have associated sub-nodes, such as default nodes 308, persistent nodes 310 and notify nodes 312 or other suitable sub-nodes.

Default nodes 308 are used to provide data for a node that is automatically constructed. In one exemplary embodiment, a node can be automatically constructed in configuration database 114 in order to allow systems and components of system 100 to communicate with each other. In this exemplary embodiment, a default node can be created as a sub-node for a related class, such as a print sub-node for data that defines a print job. The new print sub-node can contain all of the data required for the print job to be processed, and can be created as a print node sub-node, where the default node settings, notification node settings and persistent node settings are used to coordinate processing of the print job, as further described herein.

A default node value can be stored in configuration database 114 and associated with a node. Access key processor 314 can return the default node value as part of a revised input value. For example, access key processor 314 can be configured to return part of the input value as part of the revised input access key, where a hierarchical naming schema such as an XML-compliant naming schema or other suitable schema are used. In this exemplary embodiment, an XML-based naming schema might result in an input of "/A/B/C/D" to access key processor 314, and a default node value may exist for "/A/B/C," "/A/B" or "/A." The default node value can be used to provide the root for a new input key, such as "/X/Y/Z," where the entire new input key would be "/X/Y/Z/D." A default node value can be generated if an associated node value is not stored in the configuration database for an associated key value.

A node can have a default sub-node that is used to handle a request for information, which is presented by submitting a key value for a node, when there is no associated information stored at the node for that key value. The default sub-node can contain a name of another node that can be searched to satisfy the request. Rather than giving each key a default value, an hierarchal system of inheritance can be provided that determines defaults. For example, if a node value for key is not found in the database, a SOUGHT_NAME variable can be set to be the final name in the key. In this example, if the key is "/A/B/C/D/NumCopies", then SOUGHT_NAME would be set to "NumCopies". A SEEKING_NODE variable can be set to be the key with the final slash and name removed. Using the above example, in the above case, SEEKING-NODE would be "/A/B/C/D." If a default value for SEEKING_NODE exists, a new key is constructed based on the value. In the above example, if the value of "/A/B/C/D/DEFAULT" is "/X/Y/Z", then the new search is set to be to be "/X/Y/Z/Numcopies," and the search is repeated using the new key. If the SEEKING_NODE is equal to the root value, such as "/," then the search has failed. If no value for the default in the SEEKING_NODE exists, the final name is moved from the end of SEEKING_NODE to SOUGHT_KEY. For example, SOUGHT_NAME becomes "D/NumCopies", and SEEKING_NODE becomes "/A/B/C," and the search is repeated again.

Persistent nodes 310 are nodes containing data that is stored in a persistent electronic memory, such as NVRAM. Persistent node data can be stored using string keys and simple values in a tagged, self-describing data structure, unlike the anonymous, untagged (i.e. not self-describing) structures stored in NVRAM with a standard NVRAM API. Storing data in a string-based, self-describing structure is less storage efficient than pure binary encoding, but one benefit of string-based storage is that when different versions of firmware that utilizes the data are stored to a flash memory device, the database remains intact and usable. In an untagged data structure, the data would be preserved, but if the binary layout of the data changed, it would be unusable to new firmware. For such new firmware, any stored values would automatically revert to "factory default" settings. By using a tagged data structure, any new values will assume the factory default values, but any pre-existing values will be preserved.

To associate a portion of the database with a record in NVRAM or other suitable nonvolatile memory, the value of a persistent node identifier is set to equal the name of the NVRAM object, and a "persistent" key is associated with the node. All nodes or sub-nodes under the node can also be serialized into the object, and nodes at various sections of a database tree can be assigned to the same NVRAM object.

In one exemplary embodiment, persistent nodes 310 can be used to prevent interruption of scheduled tasks if a loss of power occurs. In this example, if a print job has been created and stored to a print node, the print job can inherit a default persistent node setting, such that the print job node data is backed up in persistent data memory systems 320, and is only deleted from persistent data memory systems 320 when the print job completes. In this manner, the print job data can be restored if a loss of power occurs before the print job completes.

Notify nodes 312 are utilized by the configuration database to transmit change data to any component that needs to know when a change occurs to a node. In one exemplary embodiment, a "notify" node or tag (such as a data field contained within a node) can be attached or associated with the selected node. The node associated with the notify tag can contain notification data (such as a single value), can be a node that contains sub-nodes, or can be other suitable data structures. In this exemplary embodiment, pairs of addresses and parameters can be associated with or stored in the notify node. When the notify node is triggered, each of the functions identified by the address can be called with the given parameter and a reason for why the function is called (such as when the node has changed, when the node has been deleted, or when a new sub-node has been added).

In another exemplary embodiment, a user interface system can be used to monitor processes such as print jobs. In this exemplary embodiment, control of the print jobs can be coordinated between user interface 112 (which receives user entered control data), system manager 102 (which launches the printer application in response to the user-entered control data), the peripheral 110A through 110N (that is associated with the printer) and other components of system 100, each of which communicate through configuration database 114 by accessing data stored in nodes of configuration database 114. The print job data can be stored to a new node that is a sub-node of a print node, where the print node includes an associated notify node that notifies the associated printer that a print job is available and needs to be retrieved for processing. The new node can be created using data stored in one or more default nodes associated with the print node or sub-nodes (such as sub-nodes for specific printers or types of print data). As the print job is processed, status updates can be transmitted from the printer back to configuration database 114 (such as "printing," "offline," or "finished"), and a notify node associated with the printer status node can transmit the status data to user interface 112. In this manner, all communication can be handled through configuration database 114 without the need for a communications infrastructure.

Access key processor 314 can receive an input value, such as an input key, and return the associated node value for the input value if the input value matches an access key. In general, the access key will be stored in a first memory device sector and the associated node data will be stored in a second memory device sector, but the keys and nodes can also or alternatively be stored in separate memory devices. If the input value does not match an access key stored in the first memory device sector, then access key processor 314 generates a revised input value containing a default node value, if one exists. In one exemplary embodiment, access key processor 314 can modify the input key to search for a default node value, such as by using a root portion of the input key to search for an associated default node value or default search key, and returns a search failed indication if no default node value is stored in the second data memory device sector and associated with the portion of the input value.

Update processor 316 can process notification field data if data associated with a notify node 312 is modified. In one exemplary embodiment, update processor 316 can retrieve a function stored in a sub-field of the notification field and can execute the function, such as to transmit other sub-fields contained within the notification field data to an address stored in a sub-field of the notification field. As previously discussed, the address can be associated with a component of system 100, such as user interface 112, one of peripherals 110A through 110N, or other suitable components.

Code development system 318 allows a user to associate default nodes 308, persistent nodes 310, notify nodes 312 or other suitable nodes with nodes or components that are stored in configuration database 114 while creating applications for use with system 100. In one exemplary embodiment, a user can: identify data as being required for a default node, such as to accommodate and configure new peripherals; identify data as being required to be stored as persistent data, such as user preference settings for peripherals; and identify a component or system that should be notified if a node is changed, deleted or if sub-nodes are added, such as for a status indicator on a user interface. Other suitable applications can also or alternatively be created using code development system 318, and code development system 318 provides the functionality for creating applications or other software code that utilizes the data functions and structures disclosed herein.

Persistent data memory systems 320 are one or more non-volatile data memory devices that are used to store configuration data, such as user preferences. Persistent data memory systems 320 can be updated in conjunction with persistent nodes 310 or in other suitable manners.

Locking system 322 locks nodes and sub-nodes based on data received from systems and components that access the nodes, to control simultaneous access. The operation to lock a node returns an access code or visa that must be presented with subsequent requests to access, in order to unlock the node. In one exemplary embodiment, when a key is accessed by a function, three parameters can be passed: the context, the name, and the visa. When a lock operation is performed on the node, the node is said to have a "direct lock". All sub-nodes inherit the locked state and the visa, and are said to have an "inherited lock." A node with a direct lock may not be locked again, whereas a node with an inherited lock may be locked if the visa is presented. If the visa is correct, a new visa will be returned, and that new visa must be used to access the node and its contents. The inherited lock will no longer give access to the node and its contents. When a node is locked, all reads, writes, and locks are prohibited unless the proper visa is passed with the call. Notification and persistent data processing are not performed immediately for a locked node. When a node is unlocked and is not contained within any other locked node, any pending notifications and persistent data processing is performed.

In operation, system 300 facilitates communication between components and systems of system 100 through configuration database 114. Through the use of default nodes 308, persistent nodes 310 and notify nodes 312, these components and systems can communication with each other and process data, such as data for a multi-function peripheral or other suitable data.

Figure 4:
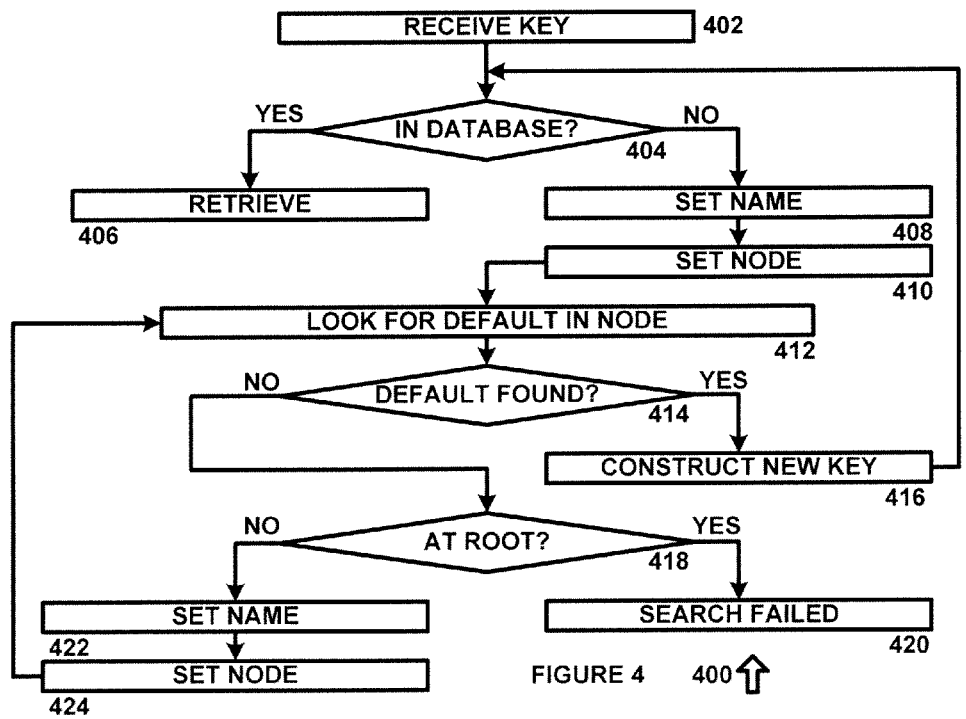
FIG. 4 is a flow chart of an algorithm for processing a key to identify a default node in accordance with an exemplary embodiment of the present disclosure.

FIG. 4 is a flow chart of an algorithm 400 for processing a key to identify a default node in accordance with an exemplary embodiment of the present disclosure. Algorithm 400 can be implemented in hardware or a suitable combination of hardware and software, such as by converting the flowchart algorithm to software code that will operate on a multi-function peripheral processor using standard programming techniques.

Algorithm 400 begins at 402 where a key is received. The key can be received as encoded data from system manager 102 or other suitable systems, and can have a predetermined data format that is defined by a number of fields and data type (such as alphanumeric). The key can be named using a hierarchical naming convention, such as an XML naming convention, or in other suitable manners. For example, the key can be named A/B/C/D, where A-D can be any suitable text string. The algorithm then proceeds to 404.

At 404, it is determined whether the key matches a key value in the configuration database. The match can be determined using a suitable matching or look-up algorithm, such as an algorithm that searches through an ordered list or other suitable algorithms. If a match is found, the algorithm proceeds to 406 and the value corresponding to the key is retrieved from the database, such as by copying a data field stored in the database that is associated with the key. Otherwise, the algorithm proceeds to 408, where a name is set. In one exemplary embodiment, the name can be set by using the least significant text string of the hierarchical key name, such as the text string associated with "D" in the example above, or in other suitable manners. The algorithm then proceeds to 410, where the node is set. In one exemplary embodiment, the node can be the remainder of the key name other than the least significant text string, such as "A/B/C" in the example above. The algorithm then proceeds to 412.

At 412, it is determined whether a default name value exists for the node assigned in 410. If it is determined at 414 that a default name has been found, the algorithm proceeds to 416 where a new key is constructed using the default name and the name set at 408. For example, if the default name value is "X/Y/Z," then the new key would be "X/Y/Z/D." The algorithm then returns to 404.

If it is determined at 412 that no default name value exists, the algorithm proceeds to 418, where it is determined whether the key is at a root. For example, using the naming convention discussed above, if the remaining key is "/D," then the key is at a root (i.e. "/") and no additional searching can be performed. The algorithm proceeds to 420 where a search failed indicator is generated. Otherwise, the algorithm proceeds to 422 where the name is set. Using the above example, the new name setting when the search for "/A/B/C/D" has not resulted in an associated node or a default for "/A/B/C," the new name would be "/C/D" for the second default node search. The algorithm then proceeds to 424 where the node is set, such as to "/A/B," for the example described above. The algorithm then returns to 412, where a search for a default node for the new node value is performed.

In operation, algorithm 400 allows a default node value structure to be used in a configuration database that allows default values for nodes to be assigned to identify information for an unidentified node. Algorithm 400 seeks for the default value that is closest to the new node value by checking each node in a hierarchical naming scheme for a default node value, starting with the node closest to the new node in the naming scheme and ending with the root node, after which a search failed indicator is returned.

Figure 5:
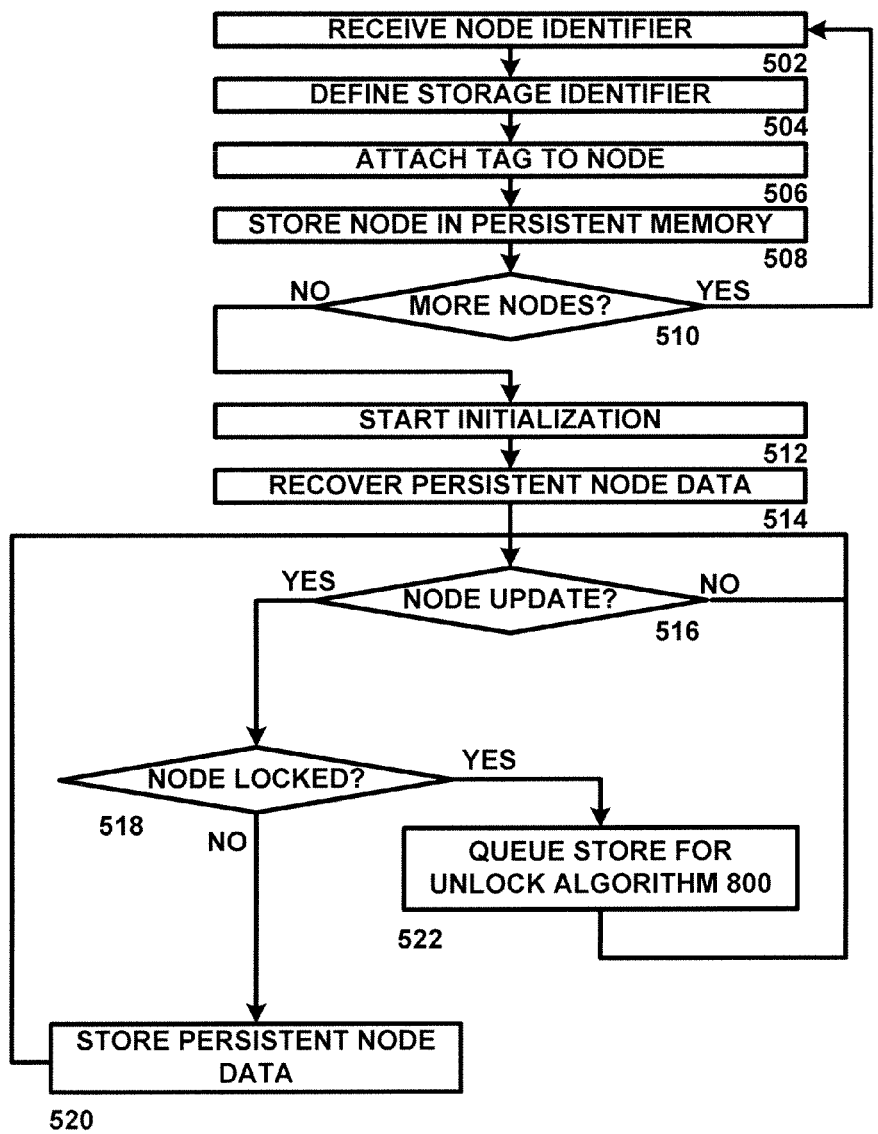
FIG. 5 is a flow chart of an algorithm for persistent storage of data associated with a node in a configuration database in accordance with an exemplary embodiment of the present disclosure.

FIG. 5 is a flow chart of an algorithm 500 for persistent storage of data associated with a node in a configuration database in accordance with an exemplary embodiment of the present disclosure. Algorithm 500 can be implemented in hardware or a suitable combination of hardware and software, such as by converting the flowchart algorithm to software code that will operate on a multi-function peripheral processor using standard programming techniques.

Algorithm 500 begins at 502 where a node identifier is received. In one exemplary embodiment, the node identifier can be received when the node is created using a software development kit as part of an application that uses a configuration database to store data associated with the node or in other suitable manners. The algorithm then proceeds to 504.

At 504, a storage identifier is defined, such as by using the software development kit to identify a persistent data memory device, such as a nonvolatile data memory device, a magnetic drive, an optical data storage device or other suitable persistent data memory devices. The algorithm then proceeds to 506.

At 506, a tag is attached to a node that associates the data stored at the node with a storage identifier. In one exemplary embodiment, the tag can be attached to the node when an application is being created or modified by a programmer, such as when the programmer indicates that data should be stored in a persistent data storage device. The algorithm then proceeds to 508.

At 508, the node data is stored in the associated persistent data memory device. In one exemplary embodiment, the node data can be stored when it is created for each node, the node data can be stored after programming for a module or application has been completed, or other suitable processes can be used. The algorithm then proceeds to 510.

At 510, it is determined whether more nodes are to be generated or processed. If it is determined that more nodes are to be generated or processed, such as when an application is being developed or compiled, the algorithm returns to 502. Otherwise, the algorithm proceeds to 512.

At 512, a database is initialized. In one exemplary embodiment, the initialization can be performed for a configuration database when a multi-function peripheral is powered on or in other suitable manners. The algorithm then proceeds to 514.

At 514, persistent node data for the nodes of the database is recovered. In one exemplary embodiment, the nodes of the database with associated tags can be identified, and the data stored in persistent memory devices can be retrieved and used to populate the database. The algorithm then proceeds to 516.

At 516, it is determined whether a node has been updated. In one exemplary embodiment, a node can be used to store user settings for devices such as printers, fax machines, or other suitable peripherals. When a user changes a setting, the setting data can be stored at a node in a configuration database. If a node has not been updated, the algorithm returns and waits for a node to be updated. Otherwise, the algorithm proceeds to 518.

At 518, the node is checked to see if it is locked. If the node is locked, the algorithm proceeds to 522. If the node is not locked, the algorithm proceeds to 520.

At 520, the updated node data is stored in the persistent data memory device. In one exemplary embodiment, the persistent data memory device can be identified using the tag data and the updated node data can be stored in the associated persistent data memory device using a suitable data storage process. The algorithm then returns to 514.

At 522, the information to update the associated persistent data memory device is queued for later processing by an unlock algorithm.

In operation, algorithm 500 allows data that should be maintained in a persistent data memory device to be easily identified, updated and recovered. Algorithm 500 can be used by programmers during the application coding process to create a structure within the application code for providing for persistent storage of selected data that is determined by the developer to be suitable for persistent storage, such as user setting selections for peripheral devices.

Figure 6:
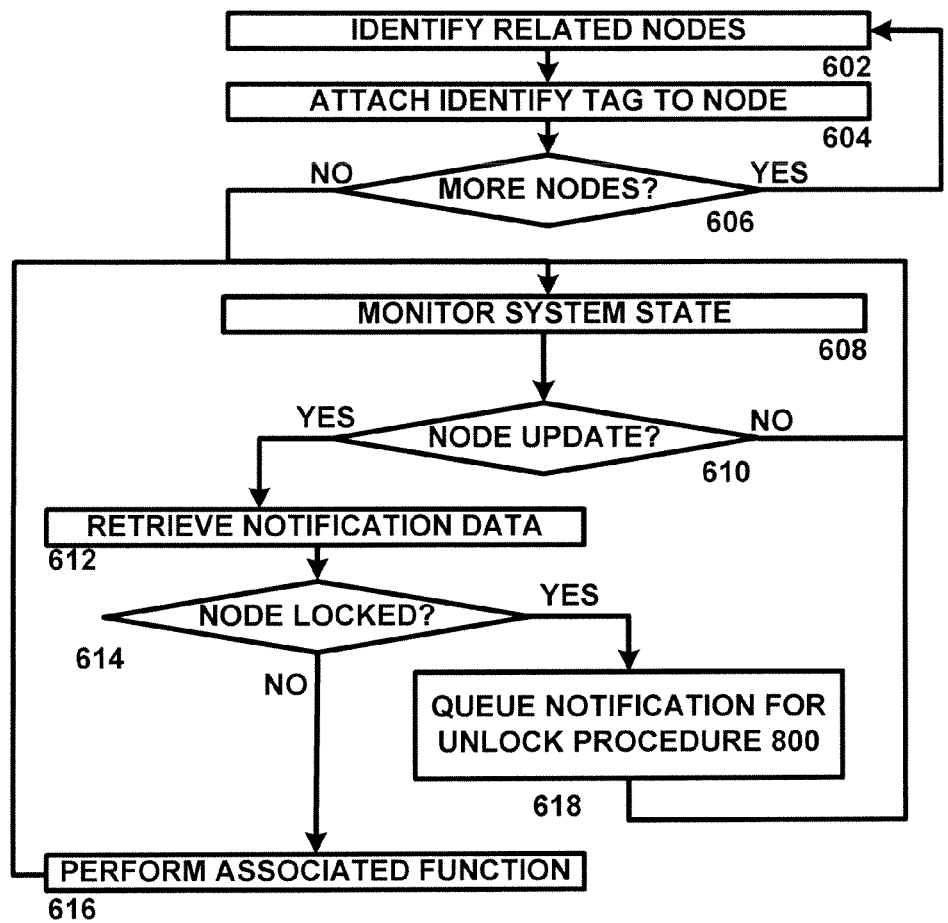
FIG. 6 is a flow chart of an algorithm for generating notification data for a database node in accordance with an exemplary embodiment of the present invention.

FIG. 6 is a flow chart of an algorithm 600 for generating notification data for a database node in accordance with an exemplary embodiment of the present invention. Algorithm 600 can be implemented in hardware or a suitable combination of hardware and software, such as by converting the flowchart algorithm to software code that will operate on a multi-function peripheral processor using standard programming techniques.

Algorithm 600 begins at 602, where a related node for an application is identified. In one exemplary embodiment, the node can be identified using a function for retrieving or setting a key value, such as a key value "get" function or a key value "set" function. In this exemplary embodiment, a set function which implies nodes that do not exist can cause those nodes to be created. If a type of the key does not result in a match when a "get" function that uses the key as an argument is called, the function can return an error, whereas if the type of a key does not match when a "set" function is called, the type can be changed.

A "set" function call can create a key in the context if it does not already exist, and a "get" function call can return a value from a default setting, if a default setting exists. A "set" function call does not change the default. In addition, after a "set" function call, any node having an associated persistent tag is updated in the persistent data memory if it is not locked. If the node is locked, the update can be delayed until all locks are removed from the node.

After a "get" or "set" function call, notification processing can be performed by looking in the node that contains the changed key for a "notify" tag. If a "notify" tag is present and the node does not have a lock, a configuration database system manager can call each of the entries in the "notify" tag and search for each of the containing contexts. If a context is present and the node is has a lock, the notification can be delayed until all locks are removed from the node, such as where bottom-up processing is necessary so that a subscription to a lower level node does not interrupt subscriptions to a higher level node.

For a notification "get" or "set" function, an address of the function to be called for notification can be provided, as well as a value for the first argument to be passed to the notification function. Additional data, such as a reason parameter, can be provided that identify a reason that a notifier was called, such as an object add, an object delete, an object change, other suitable reasons or a combination of suitable reasons. Restrictions can also be imposed on the notification function, such as to prevent a configuration database application programming interface from being called from the notification callbacks. The algorithm then proceeds to 604.

At 604, a notification tag is attached to the node. As discussed above, the notification tag can include an address of a function to be called, a value for a first argument, or other suitable data. The algorithm then proceeds to 606.

At 606, it is determined whether any additional nodes are to be processed. If no additional nodes are to be processed, the algorithm proceeds to 608, otherwise the algorithm returns to 602.

At 608, a system state is monitored, such as by a system manager of a configuration database or other suitable systems. The algorithm then proceeds to 610 where it is determined whether a node has been updated, such as if an object has been added, changed, deleted or if other suitable node updates have occurred. If no update has occurred, system state monitoring continues. Otherwise, the algorithm proceeds to 612.

At 612, notification data associated with a node is obtained, as discussed above. The algorithm then proceeds to 614.

At 614 it is determined if the node is locked. If the node is not locked, the algorithm proceeds to 616 where the associated function is called, as described above. If the node is locked, the algorithm proceeds to 618.

At 616 the notification function is called with the notification function argument and the reason for the notification. The algorithm then proceeds to 608 to wait for the next change.

At 618 the notification function, the notification function argument, and the reason for the notification are queued for subsequent processing by an unlock algorithm. The algorithm proceeds to 608 to continue monitoring for changes to the node or nodes.

In operation, algorithm 600 allows a component to be notified when a change occurs to a related node. Algorithm 600 only provides notification when a change occurs, and does not require the component to periodically issue a query to determine whether a change has occurred. In addition, algorithm 600 avoids other problems that can exist with disseminating information about changes to system state, settings or configuration to other affected systems.

Figure 7:
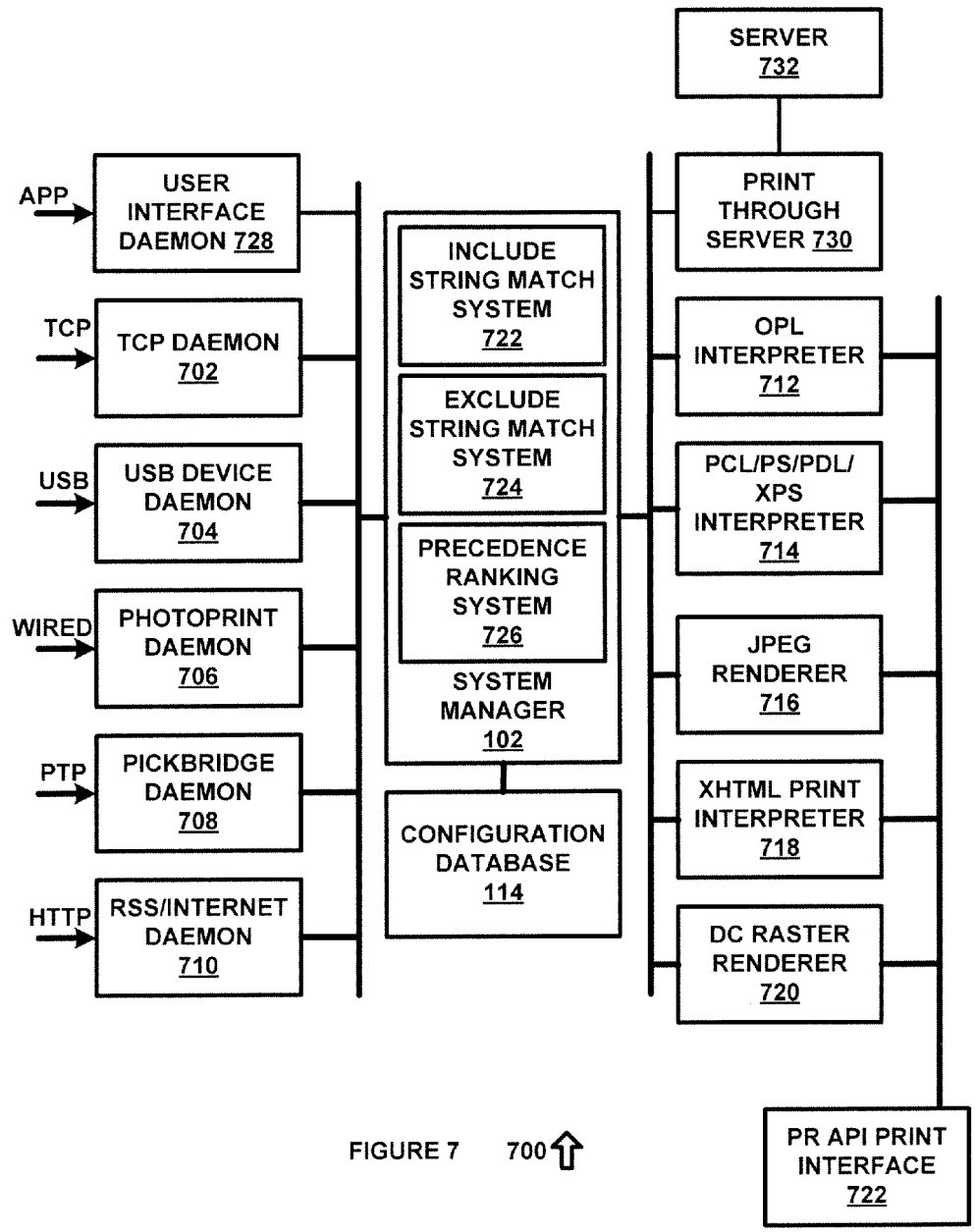
FIG. 7 is a diagram of a system for configurable application data steering in accordance with an exemplary embodiment of the present invention.

FIG. 7 is a diagram of a system 700 for configurable application data steering in accordance with an exemplary embodiment of the present invention. System 700 allows a data stream to be steered to an appropriate application without user selection of the application.

System 700 includes TCP daemon 702, USB device daemon 704, BlueTooth daemon 706, PictBridge daemon 708 and RSS/Internet daemon 710, each of which operate as a background process and monitor communications on one or more associated data ports, such as a transmission control protocol (TCP) port, a universal serial bus (USB) port, a wired port, a picture transfer protocol (PTP) port or a hypertext transfer protocol (HTTP) port. When a data is received at a data port, the associated daemon prepares a stream to contain the data. The daemon uses the first bytes of the file as a challenge and transmits a query to system manager 102 to identify the node of a PRINT_PROCESSOR class of applications which should be given the task of processing the data stream. If system manager 102 finds an application, it builds a sub-node in configuration database 114 that contains the parameters needed by the application. System manager 102 then launches the application.

In addition, system 700 includes user interface daemon 728, which receives a file for input to system manager 102 from a source such as a data storage device, an email, an Internet Print Protocol request, or other suitable sources. User interface daemon 728 can detect an incoming print request from such sources, can generate a user prompt on a user interface device of a printer, or can use other suitable systems or processes.

In order to support launch, each application can have a record containing any defaults specific to the application. For instance, a "print-to-JPEG" application may have JPEG quantization settings that would not be provided by a universal daemon. The application also creates and populates an application defaults node. When a daemon launches a PRINT_PROCESSOR class application, the daemon can include a "DEFAULT" record that directs unresolved keys to the application specific default node.

A PRINT_PROCESSOR reads its input from a stream that is provided as a parameter. The application processors (such as a PDL application processors), can register as a member of an application class by specifying two regular expressions (an include string and an exclude string) and a precedence. When an agent, such as port input software, determines that it should start an application of a class, it presents a character string to be matched against the applications registered in that class. The algorithm may be optimized to reduce the number of regular expression matches.

System Manager 102 launches applications, such as OPL interpreter 712, PCL/PS/PDL/XPS interpreter 714, JPEG renderer 716, XHTML print interpreter 718, DC raster renderer 720 and print through server 720 and matches the string against the first of the regular expressions for each application in the class. For those which match, it then matches the second regular expression against the string—any of those which match result in the application being removed from consideration. Of those which remain, the application with the highest precedence is chosen. Through this algorithm, the knowledge of how to discriminate which application should be used is embodied in the application, not in the port handler. When different applications are included in a particular instance (implementation) of an MFP, the application registers the knowledge with the SY, and the port handling is not changed.

Include string match system 722 receives a data stream from one the daemons and compares the data stream with include string data for each of a plurality of applications. In one exemplary embodiment, the include string data can include a predetermined sequence of data in a single data field, groups of data sequences in different data fields, or other suitable combinations of data. Include string match system 722 generates an output that identifies one or more applications with matching include string data.

Exclude string match system 724 receives a data stream from one the daemons and compares the data stream with exclude string data for each of a plurality of applications. In one exemplary embodiment, the exclude string data can include a predetermined sequence of data in a single data field, groups of data sequences in different data fields, or other suitable combinations of data. Exclude string match system 724 generates an output that identifies one or more applications with matching exclude string data.

Precedence ranking system 726 receives two or more selected applications and selects one of the applications based on the precedence of each application. In one exemplary embodiment, each application can have an associated precedence, where the application with a higher precedence will be selected over an application with a lower precedence. In the event of equal precedence, the choice can be made randomly, by selecting the application registered first, the application registered later, by a user selection through a user interface prompt, an error can be reported, or other suitable processes can be used.

Print through server 730 is registered with an "include" match string, an "exclude" match string, and a precedence. The "include" string can be permissive, for example, "*" which means "anything at all". The "exclude" match string can be used if there are specific inputs that should NOT be sent to the server. The precedence can be set very low, such as "0," so that if any other print processor matches the input, it would be used rather than the "print through server" print processor. The remainder of the function is determined by the print through server 730 print processor. In this manner, the use of a permissive "include" string and a low precedence allows print through server 720 to operate as the print processor of final resort.

In operation, system 700 uses an input data stream to select between two or more potential applications that may use the data stream, by determining if an include pattern and an exclude pattern are present. If two or more applications have an include pattern and no exclude pattern, or an include pattern and an exclude pattern, then the application with the highest precedence is selected.

Figure 8:
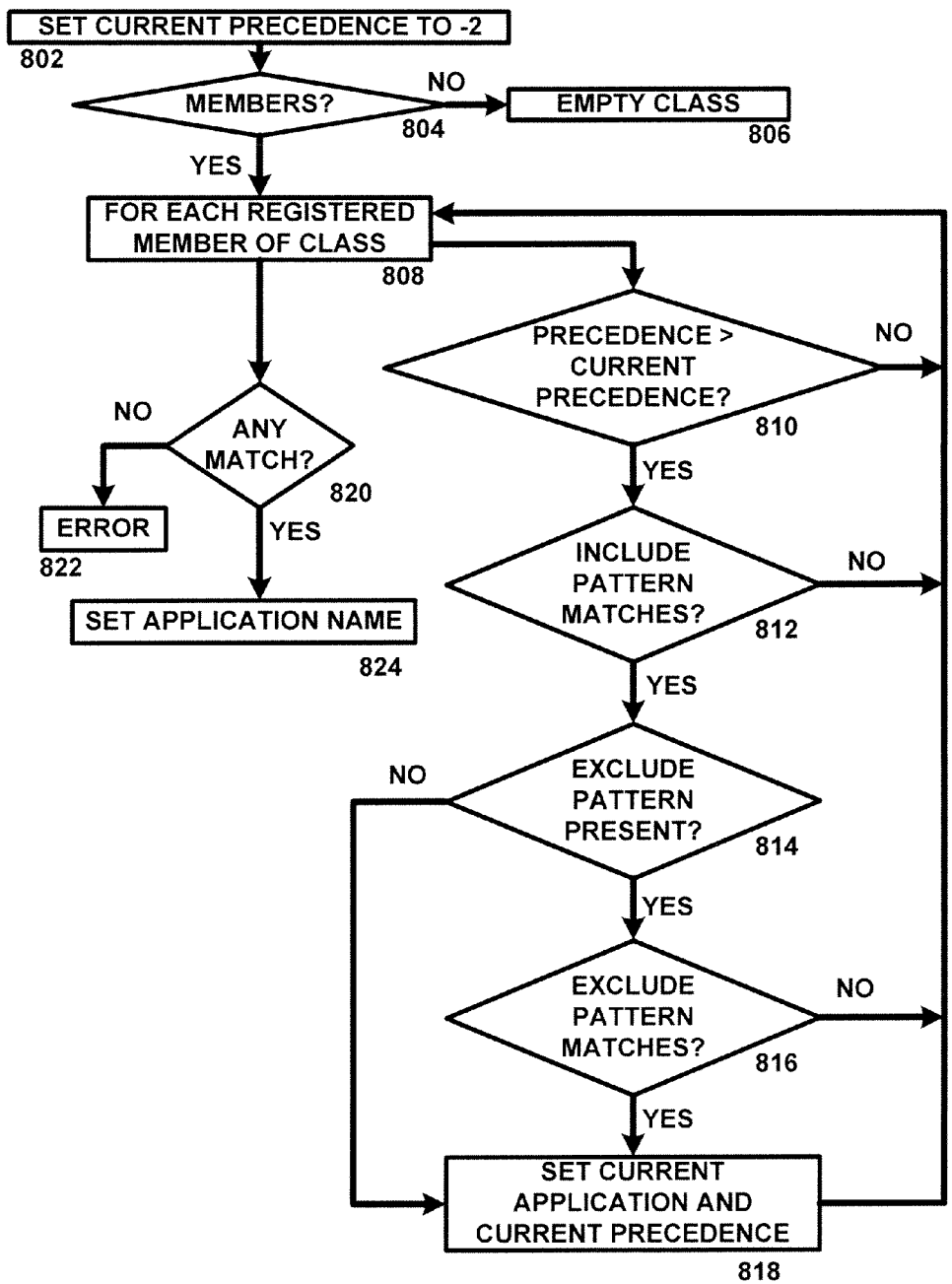
FIG. 8 is a diagram of an algorithm for configurable application data steering in accordance with an exemplary embodiment of the present invention.

FIG. 8 is a diagram of an algorithm 800 for configurable application data steering in accordance with an exemplary embodiment of the present invention. Algorithm 800 can be implemented in hardware or a suitable combination of hardware and software, such as by converting the flowchart algorithm to software code that will operate on a multi-function peripheral processor using standard programming techniques.

Algorithm 800 begins at 802, where a precedence variable is set to a predetermined starting value, such as −2. The starting precedence value can be set to prevent a false precedence value from a prior application selection process from being applied during a new application selection process or for other suitable purposes. The algorithm then proceeds to 804.

At 804, it is determined whether there are any registered members of a current class of applications that is to be searched. For example, if a print application is being searched, it can be determined whether there are any members of the print class of applications. If there are no members in the class, the algorithm proceeds to 806 where an empty class indicator is generated. The algorithm can then proceed to the next class, can terminate, or other suitable processes can be used.

If it is determined at 804 that there are registered members of the current class, the algorithm proceeds to 808 where a process is initiated for each registered member of the class. For each member, the algorithm proceeds to 810 where it is determined whether the precedence of the current class member is greater than a current value of the precedence. If not, then the algorithm returns to 808. Otherwise, the algorithm proceeds to 812.

At 812, it is determined whether an include pattern of the application matches any string contained within a received data stream. In one exemplary embodiment of the disclosure, the include strings can be specified as regular expressions, such as PERL programming language expressions. Thus, the include string can match a single string value (e.g. "ABCDEF"), multiple string values (e.g. "ABC" and "DEF"), multiple string values separated by a predetermined number of fields (e.g. "ABD" within five character values of "DEF") or other suitable string value or values. If it is determined that the include string of the application does not match any sequence of characters contained within a received data stream, the algorithm returns to 808, otherwise the algorithm proceeds to 814.

At 814, it is determined whether an exclude string is available for the application. For example, an application might not be amenable to exclude string processing, such as where an exclude string need not be identified. If there is no exclude string for the application, the algorithm proceeds to 818, otherwise the algorithm proceeds to 816 if an exclude string is present for the application.

At 816, it is determined whether the exclude string of the application matches any string contained within a received data stream. In an exemplary embodiment of the disclosure, the exclude strings can be specified as regular expressions, such as PERL programming language expressions. Thus, the exclude string can a single string value (e.g. "ABCDEF"), multiple string values (e.g. "ABC" and "DEF"), multiple string values separated by a predetermined number of fields (e.g. "ABD" within five character values of "DEF") or other suitable string value or values. If it is determined that the exclude string of the application matches any sequence of characters contained within a received data stream, the algorithm returns to 808, otherwise the algorithm proceeds to 818.

At 818, the values of an application variable (such as the name of an application) and a precedence variable are set to equal the values for the current application being processed. The algorithm then returns to 808.

After processing each member of the class, the algorithm proceeds to 820 where it is determined whether any matching application has been identified. If no matching application has been identified, the algorithm proceeds to 822 where an error indicator is generated. Otherwise, the algorithm proceeds to 824 where the currently selected application is used to process the data stream.

Figure 9:
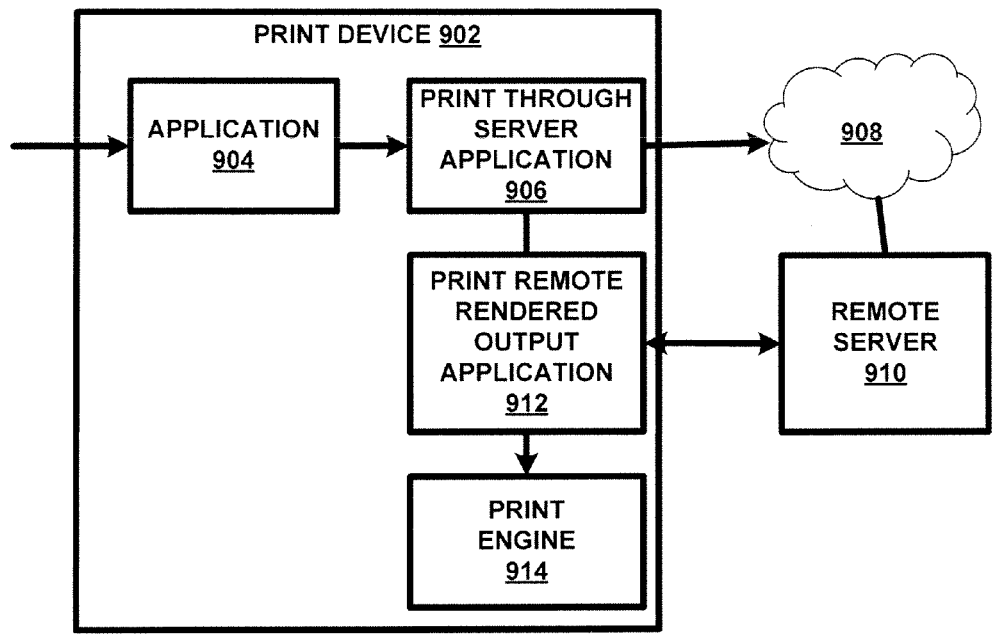
FIG. 9 is a diagram of a system for print through server processing in accordance with an exemplary embodiment of the present disclosure.

FIG. 9 is a diagram of a system 900 for print through server processing in accordance with an exemplary embodiment of the present disclosure. Application 904 in print device 902 receives a file to be printed and uses a list of file types that need to be sent to a remote server for rendering, which can include validation, storage and language translation before or after rendering. In one exemplary embodiment, the list can include data identifying file types that can be handled locally and file types that need to be sent to a cloud printing service or other suitable network services for processing, such as:

| File type | Processing |
|---|---|
| JPG | Local application A |
| PCL5 | Local application B |
| DOC | Print through server |
| TIFF | Print through server |
| PDF | Print through server |
| PS | Print through server |
| XPS | Print through server |

The determination of the type of input file can be performed by comparing the IANA MIME Type provided along with the file, such as in the case of emails and Internet Print Protocol, by evaluating the extension used in the filename, by parsing the file contents or in other suitable manners. In some cases, additional steps may need to be performed prior to sending the file, such as if the file is an encrypted PDF (which can be determined by parsing the file), in which case a password that is used to decrypt the file may be requested from the user by the application. In another exemplary embodiment, if the language used in the file does not match the locale of the printer, a user prompt or other process for determining the preference of translation may also be used. The file is then sent by print through server application 906, along with any related information, such as the password, the format in which the output is desired, the language into which the output is to be rendered in, and typical job settings (such as collation, duplex, media size) to a remote server 910 that is either discovered through discovery services, or to a named server (local or through cloud 908) that is either programmed into the printer or configured by the user. The file is then received at print remote rendered output application 912 from remote server 910 that is rendered into the format requested by the printer. This may be implemented using a push mechanism in which the printer simply waits for the converted file, a pull mechanism where the printer queries the server for the rendered output, or in other suitable manners. The rendered output is then printed by print engine 914.

Figure 10:
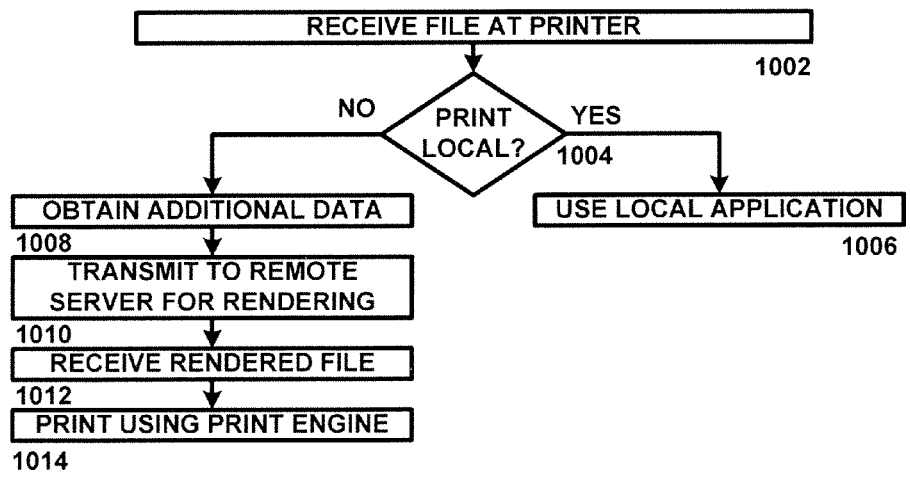
FIG. 10 is a diagram of an algorithm for processing a print job in accordance with an exemplary embodiment of the present disclosure.

FIG. 10 is a diagram of an algorithm 1000 for processing a print job in accordance with an exemplary embodiment of the present disclosure. Algorithm 1000 can be implemented in hardware or a suitable combination of hardware and software, and can be one or more software systems operating on a processor.

Algorithm 1000 begins at 1002, where a file is received at a printer. In one exemplary embodiment, the file can be received from a portable memory device such as a USB drive, from an email, or from other suitable sources or applications. The algorithm then proceeds to 1004, where it is determined whether the file is in a format that can be prepared for printing using a local application, such as a print driver that is operating on the printer processor or an associated processor. In one exemplary embodiment, the determination can be made by comparing the IANA MIME Type provided along with the file, such as in the case of emails and Internet Print Protocol, by evaluating the extension used in the filename, by parsing the file contents or in other suitable manners. In another exemplary embodiment, the file or data stream can be passed through system 700, and system manager 102 can determine the proper application to process the file or the data stream. If a permissive "Include" match is not desired, then suitable "Include" and "Exclude" Match strings corresponding to the file type that is to be steered to "Print Through Server" can be specified. The MIME type table lookup is one of the ways of starting the "Print Through Server" application. If it is determined that the file can be prepared for printing using a local application, the algorithm proceeds to 1006 where the local application is used to render the file for printing. Otherwise, the algorithm proceeds to 1008.

At 1008, additional data required for printing is obtained. In one exemplary embodiment, it can be determined that the file is in an encrypted format and that a password is required to access the file for printing. In this exemplary embodiment, a prompt can be generated for a user to enter the password, such as in a user interface device of the printer, by reply email or in other suitable manners. In addition, the language into which the output is to be rendered, print job settings such as collation, duplex and media size or other suitable data can also or alternatively be obtained. The algorithm then proceeds to 1010.

At 1010, the file and associated data is transmitted to a remote server for rendering. The remote server can be identified using a discovery service that uses the file type or other suitable data to identify a network address associated with the remote server, the network address (such as for a local network device or a device that is associated with a network cloud) can be stored locally at the printer, a user can provide or select a remote server, or other suitable processes can also or alternatively be used. The algorithm then proceeds to 1012.

At 1012, the rendered print file is received. In one exemplary embodiment, a push mechanism or process can be utilized in which the printer waits for the converted file to be transmitted from the remote server, a pull mechanism or process can be used where the printer queries the remote server for the rendered output, or other suitable processes can also or alternatively be used. The algorithm then proceeds to 1014 where the rendered print file is printed using a print engine.

In operation, algorithm 1000 allows a printer to process a file that is sent to the printer for printing using local printer drivers or applications if they support the file, or to use a remote server to render the file for printing if no local applications can process the file for printing. In this manner, files can be received from a data storage device, an email, an Internet Print Protocol or in other suitable manners other than from an application that is operating on a processor that is associated with the printer, and can be printed regardless of whether local support for printing the file type exists.

It should be emphasized that the above-described embodiments are merely examples of possible implementations. Suitable variations and modifications can be made to the above-described embodiments without departing from the principles of the present disclosure. All such modifications and variations are intended to be included herein within the scope of this disclosure and protected by the following claims.

What is claimed is:

1. A system for printing comprising:
a plurality of local printer applications operating on a processor of a printer, each configured to render one or more associated file types for printing;
a print through server application operating on the processor and configured to transmit a print job to an external processor for rendering; and
a system manager operating on the processor and configured to transmit a file to one of the plurality of local printer applications if the file has a file type that is identical to the file type associated with one of the local printer applications, and to transmit the file to the print through server application if the file type of the file does not match any of the file types for the local printer applications.

2. The system of claim 1 wherein the system manager is configured to receive a precedence, an include data string and an exclude data string for the file and to select one of the local printer applications or the print through server application as a function of the precedence, the include data string and the exclude data string using an iterative process.

3. The system of claim 2 wherein the system manager further comprises an exclude string match system configured generate an output that identifies each of the local printer applications and the print through server application that have a matching exclude data string to the exclude data string of the file using an iterative process for each registered member of a class.

4. The system of claim 2 wherein the system manager further comprises a precedence ranking system configured to determine which of the local printer applications and the print through server application has a highest precedence as a function of the include data string and the exclude data string.

5. The system of claim 2 wherein the associated precedence, the include data string and the exclude data string for each of the local printer applications and the print through server application comprises a plurality of include data strings and a plurality of exclude data strings for a plurality of local printer applications, each of which is received from a configuration database.

6. The system of claim 2 wherein an identification of the file is received from a notify node of a configuration database by using an access key to access the configuration database.

7. The system of claim 1 wherein the plurality of local printer applications, the print through server application and the system manager each communicate by storing data in a configuration database, and each use a different access key to access the configuration database.

8. A method for printing comprising:
receiving an input file;
comparing an include data string for the input file to a plurality of include data strings using a processor and an iterative process, each include data string associated with a local printer application and a print through server application; and
selecting one or more of the local printer applications and the print through server application having an include data string that matches the include data string for the input file using the processor and as a function of a precedence determined by the iterative process.

9. The method of claim 8 further comprising comparing using the iterative process, the include data string to a plurality of exclude data strings, each exclude data string associated with one of the local printer applications and the print through server application.

10. The method of claim 9 further comprising excluding one or more of the selected local printer applications and the print through server application having an exclude data string that matches the exclude data string of the input file using the iterative process.

11. A method for printing a file comprising:
receiving a file;
determining whether the file can be rendered locally by processing data contents of the file;
rendering the file for printing using one or more local printer applications if it is determined that the file can be rendered locally; and
transmitting the file to a print through server application if it is determined that the file cannot be rendered locally.

12. The method of claim 11 wherein determining whether the file can be rendered locally by processing the data contents of the file comprises comparing an IANA Mime type to a list of IANA Mime types.

13. The method of claim 11 wherein determining whether the file can be rendered locally by processing the data contents of the file comprises parsing the data contents of the data file.

14. The method of claim 11 further comprising:
determining at the print through server application that additional information is required to print the file; and
generating a request for the additional information.

15. The method of claim 12 further comprising:
transmitting a request from a print remote rendered output application to the remote server for a rendered print file; and
receiving the rendered print file at the print remote rendered output application from the remote server.

16. The method of claim 11 wherein receiving the file comprises receiving the file by email, and further comprising:
determining at the print through server application that additional information is required to print the file;
generating a request for the additional information; and
transmitting the request for the additional information by reply email.

17. The method of claim 11 wherein rendering the file for printing using one of the local printer applications if the file can be rendered using one of the local printer applications comprises determining whether a file type of the file can be rendered using one of the local printer applications.

18. The method of claim 17 wherein determining whether a file type of the file can be rendered using one of the local printer applications comprises determining whether the file type is in a list of file types associated with the local printer applications.

19. The method of claim 11 wherein transmitting the file to the print through server application if the file cannot be rendered using one of the local printer applications further comprises:
determining that a password is required from a user; and
generating a user prompt to request the password from the user at the printer.

20. The method of claim 11 further comprising translating the file from a first language to a second language.

* * * * *